United States Patent [19]

Bach et al.

[11] Patent Number: 5,620,756

[45] Date of Patent: Apr. 15, 1997

[54] PRODUCTION OF A FERROELECTRIC OR ANTIFERROELECTRIC OR FERRIELECTRIC ORDER IN LIQUID CRYSTALS WHICH SOLIDIFY IN A GLASS-LIKE MANNER

[75] Inventors: Volker Bach, Neustadt; Karl-Heinz Etzbach; Karl Siemensmeyer, both of Frankenthal; Gerhard Wagenblast, Weisenheim, all of Germany

[73] Assignee: BASF Aktiengesellschaft, Ludwigshafen, Germany

[21] Appl. No.: 498,648

[22] Filed: Jul. 6, 1995

Related U.S. Application Data

[63] Continuation of Ser. No. 973,970, Nov. 9, 1992, abandoned.

[30] Foreign Application Priority Data

Nov. 14, 1991 [DE] Germany ............................ 41 37 408.8

[51] Int. Cl.$^6$ .............................. G07F 1/137; C09K 19/38

[52] U.S. Cl. ..................... 428/1; 430/20; 252/299.01; 576/313

[58] Field of Search .................. 526/313; 252/299.01; 428/1; 430/20

[56] References Cited

U.S. PATENT DOCUMENTS

| 4,997,591 | 3/1991 | Heppke et al. | 252/299.61 |
| 5,039,208 | 8/1991 | Ohnishi et al. | 359/100 |
| 5,187,248 | 2/1993 | Etzbach et al. | 526/243 |

*Primary Examiner*—Mark Nagumo
*Attorney, Agent, or Firm*—Keil & Weinkauf

[57] ABSTRACT

The process according to the invention is a process for the production of aligned, ferroelectrically or ferrielectrically or antiferroelectrically ordered materials which solidify in a glass-like manner. In these layer structures with polar order, the molecular dipole moments are uncompensated, partially compensated or fully compensated, so that a dipole moment corresponding to the degree of compensation, acts externally.

9 Claims, No Drawings

PRODUCTION OF A FERROELECTRIC OR ANTIFERROELECTRIC OR FERRIELECTRIC ORDER IN LIQUID CRYSTALS WHICH SOLIDIFY IN A GLASS-LIKE MANNER

This application is a continuation of application Ser. No. 07/973,970, filed on Nov. 9, 1992, now abandoned.

The present invention relates to a process for the production of a ferroelectric or antiferroelectric or ferrielectric order in antiferroelectric, smectic, liquid-crystalline liquid crystals which solidify in a glass-like manner.

There exist liquid-crystalline polymers in which the liquid-crystalline phase has been frozen in a nematic alignment or in an orthogonal layer structure (orthogonal smectic phases) or in a tilted layer structure (tilted smectic phases) (cf. DE-A 39 17 196). Low-molecular-weight, tilted, ferroelectric, smectic, liquid-crystalline materials which have solidified into a glass phase are also known.

It is furthermore known that antiferroelectric or ferrielectric phases occur in low-molecular-weight liquid crystals (Jap. J. Appl. Phys., 28 (1989), L1265), but these cannot be frozen in a glass-like manner.

It is also known that antiferroelectric phases occur in polymeric liquid-crystalline phases (Third Int. Conference on Ferroelectric Liquid Crystals, Boulder, Colo., 24–28 Jun. 1991).

The known materials can advantageously be used in the areas of integrated optics, opto-electronics and data storage, illustrative uses being in opto-electronic equipment, such as displays, opto-electronic shutters, opto-electronic diaphragms, memory elements, optical modulators, printer heads and multifocal lenses (H. Finkelmann in Polymer Liquid Crystals, Eds. A. Ciferri, W. R. Krigbaum, R. B. Meyer, Academic Press, 1982).

However, the materials disclosed hitherto have disadvantages, for example unstable states in the glass state ferroelectric liquid-crystalline polymers are only capable of bistable switching between two states poor processing properties (for example in the production of devices)

problems with switchability excessively long response times too narrow state ranges of the phases not freezable in the antiferroelectric phase structure.

It is an object of the present invention to find novel liquid-crystalline states or phases which have solidified in a glass-like manner, have a polar order and do not have the disadvantages of the prior art. A further object of the present invention is to find a process for the production of liquid-crystalline states which have been frozen in a glass-like manner.

We have found that these objects have been achieved by a process for the production of a ferroelectric or antiferroelectric or ferrielectric order in liquid crystals which solidify into a glass phase, by heating a mesogenic compound to above the glass transition temperature, which is above 25° C., preferably above 35° C., very particularly preferably above 45° C., and subsequently cooling the compound to below the glass transition temperature.

The materials to be used according to the invention are chiral compounds or chiral polymers which have liquid-crystalline states within certain temperature ranges and solidify into a glass phase below certain temperature ranges, a layer structure being frozen in the glass state of the polymer. Within a layer of this layer structure, the centers of gravity of the polymer side chains or the chiral compounds are in a random or ordered distribution. The director n, which defines the preferential direction of the polymer side chains, has a tilt to the layer perpendicular z, indicated by means of the angle between n and z. The angle is known as the tilt angle. The tilt angle can either be present inherently or induced by external forces, for example electrical and/or magnetic fields and/or shear forces.

For example, an electrical field which has either a positive or negative sign and a strength greater than the critical field strength of from 3 to 40 V/μm to induce the desired tilt angle. The application of an electrical field of from less than 2 to 40 V/μm, which is below the critical field strength and is thus of such a magnitude that no complete ferroelectric order is produced, so that the molecular dipole moments are not fully ordered, a macroscopic dipole moments results which is proportional to the applied electrical field. If little or no electrical field is applied during the cooling operation the molecular transverse dipole moments of the mesogenic compounds may be ordered, in macroscopic terms, so that their macroscopic dipole moment is zero or virtually zero.

The materials to be used according to the invention, which are in a layer structure with induced or inherent tilt, should have polar properties in a microlayer, such as, for example, in a chiral smectic liquid-crystalline C phase ($S_c^*$ phase). However, the polar properties of a microlayer should be partially or fully compensated by the polar properties of the directly adjacent layers.

Such behavior is known as ferrielectric or antiferroelectric.

These materials are preferably employed in the following areas:

electrical, magnetic and/or optical storage systems, electrophotography as electronic components or as constituents of electronic components as electro-optical components or as constituents of electro-optical components in printing processes.

Surprisingly, the materials to be used according to the invention, when subjected to the process according to the invention for the production of a ferroelectric or antiferroelectric or ferrielectric order in antiferroelectric, smectic, liquid-crystalline liquid crystals which solidify into a glass phase, have advantageous properties, for example shorter response times tristable switching broad state ranges freezability of the polar order field-dependent polar order.

EXAMPLES

General experimental procedure

Sample preparation:

The sample was prepared in cells between two structured, plane-parallel glass plates which had electroconductive coatings and onto which a polyimide alignment layer had been applied by known methods. The layer thickness of the liquid-crystalline sample was on average 4 μm and was determined for each measurement cell by interferometry.

The measurement cell was filled with the substance in the isotropic phase by means of capillary forces. To this end, the cell containing the substance applied to the edge was heated to a temperature above the clearing point. Due to the capillary effect of the cell, the material was drawn into the cell cavity and was then slowly cooled into the liquid-crystalline phase. In combination with the effect of the alignment layer, this caused the desired planar edge alignment of the liquid crystal. In order to improve the alignment, an electrical and/or magnetic field can also be applied.

Polarization and tilt angle measurements:

In order to determine the tilt angle and the spontaneous polarization, the sample to be investigated was prepared and aligned in a cell by the abovementioned method. The temperature control was carried out using a Mettler FP 800/85 microscope heating stage.

The spontaneous polarization was determined by the triangle method (K. Miyasato et al., Jap. J. Appl. Phys. 22 (1983), L661). The voltage signal used for this purpose was generated by means of a function generator (Wavetek 273) and amplified by means of a power amplifier (Krohn Hite 7500). The current was recorded as a function of time by a storage oscilloscope (Hewlett Packard HP54501). The spontaneous polarization was then determined from the measured time dependence of the current.

The sign of the polarization was determined in accordance with the convention of Lagerwall et al. (S. T. Lagerwall, I. Dahl, Mol. Cryst. Liq. Cryst., 114 (1984), 151).

The tilt angle was determined by measuring the switching angle.

In the initial state, the director n of the tilted smectic layer in an applied electrical field +E is parallel to the direction of the polarizer and perpendicular to the analyzer. The sample appears dark. If the electrical field is switched from +E to −E, the director n is rotated through an angle α, the switching angle, which corresponds to twice the tilt angle. By rotating the microscope rotating stage beyond the layer perpendicular z until maximum extinction is obtained again, the switching angle, which corresponds to the angle of rotation of the microscope stage, is determined.

The response time is determined from the change in transmission on changing the field strength from −E to +E. The following procedure was used:

The sample was aligned between crossed polarizers so that the sample appeared dark with the field +E applied. A field of −E was then applied. The sample became bright. In order to determine the switching time, the field was rapidly changed from −E to +E, while at the same time the change in transmission was followed by means of a photodiode. The response time was determined as the 10%/90% value.

Suitable materials to be used according to the invention are substances as described in DE-A 39 17 196 which corresponds to U.S. Pat. No. 5,187,248. The polymer materials are very highly suitable if the dispersity is low (<1.2) and the molecular weight of the polymers is in the range from 2000 to 10,000 g/mol.

The materials to be used according to the invention have a uniaxial phase structure optically in the absence of an electrical field.

The materials to be used according to the invention also have a pronounced jump behavior of the tilt angle within the liquid-crystalline phase and above the glass phase. This means that if a certain applied field strength, depending on the substance and temperature, is exceeded, the liquid crystal switches from the antiferroelectric or ferrielectric order to the ferroelectric order.

This pronounced jump behavior of the tilt angle is associated with the flow of a polarization current corresponding to the change in dipole density.

In all the examples, the samples were prepared as described above.

The following liquid-crystalline material was used for Examples 1 to 3:

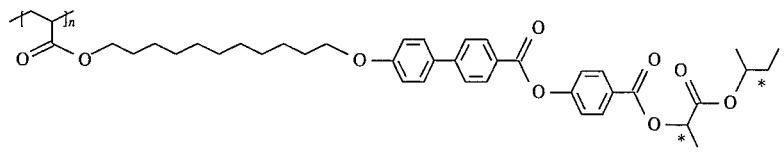

The material has the phase behavior G1 45 $S_{c\ A}^{*}$ 134 $S_S$ 160 I.

EXAMPLE 1

Preparation of an antiferroelectrically aligned glass

No electrical field is applied to the cell filled with the abovementioned liquid-crystalline material during the cooling operation into the glass phase. The antiferroelectric order of the microlayers forms as described above. The cooling rate is unimportant. An optically uniaxial, orthogonal structure which has no surface polarization is formed. The optical tilt angle within the sample treated in this way is zero.

EXAMPLE 2

Preparation of a ferrielectrically aligned glass

An electrical field is applied to the cell filled with the abovementioned liquid-crystalline material during the cooling operation into the glass phase. This electrical field is smaller than the transition field strength $E_t$ above which the ferroelectric order forms. The ferrielectric order of the microlayers forms as described above. The cooling rate is unimportant. An optically biaxial, tilted structure is formed. The tilt angle and thus also the dipole density within the sample treated in this way depends on the applied field strength E. The sign of the surface polarization is affected by the field direction.

| Applied field V/μm | Tilt angle grd | Surface polarization Sign |
|---|---|---|
| +25 | 10 | + |
| +37 | 15 | + |
| −25 | 10 | − |
| −37 | 15 | − |

EXAMPLE 3

Preparation of a ferroelectrically aligned glass

An electrical field is applied to the cell filled with the abovementioned liquid-crystalline material during the cooling operation into the glass phase. This electrical field is greater than the transition field strength $E_t$ above which the ferroelectric order forms. The cooling rate is unimportant.

An optically biaxial, tilted structure is formed. The tilt angle no longer depends on the applied field above the transition field strength. The dipole density within the sample treated in this way is constant and independent of the applied field strength E. The sign of the surface polarization is affected by the field direction.

EXAMPLE 4

Shorter response times in the antiferroelectric structure
The following liquid crystal was used for Example 4:

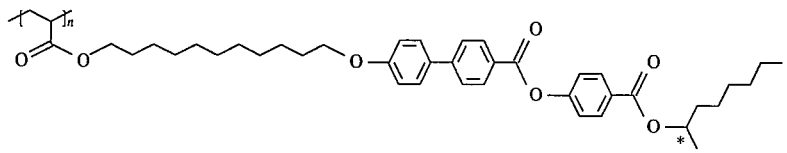

The phase sequence of this substance is $$G1\ 45\ S_{c\ A}^{*}\ 160\ S_A\ 185\ I$$

The sample was introduced into the cell and aligned by the method described above. The response time experiments were carried out in the liquid-crystalline phase at 140° C. The response time was determined at a field strength of 10 V/μm and 17.5 V/μm. The response time from a contrast of 10% to a contrast of 90% is 40 μs at a field strength of 10 V/μm (this is a ferrielectric alignment), whereas the response time from a contrast of 10% to a contrast of 90% is 115 μs at a field strength of 17.5 V/μm (this is a ferroelectric alignment).

EXAMPLE 5

Stability of the glass state

The same material was used and the samples were prepared in the same way as in Examples 1 to 3. The samples were slowly cooled to the glass state at an applied field strength of 20 V/μm. No change in the sample and the frozen glass state was detectable over a period of more than 3 months.

Tilt angle after freezing: 10°
Tilt angle after 6 months: 10°

We claim:

1. A process for the orientation of mesogenic polymeric liquid crystals in an electrical field wherein the mesogenic polymeric liquid crystalline material has a glass transition temperature of above 25° C., a molecular weight range of from 2,000 to 10,000 g/mol, an antiferroelectric smectic liquid crystalline behavior above its glass transition temperature, an optically uniaxial phase structure in the absence of an electrical field and solidifies into a glass phase, and wherein the process comprises the following steps:

heating a chiral polymeric material above its glass transition temperature applying an electrical field of a strength sufficient to allow orientation of the liquid crystalline material into a ferroelectric, ferrielectric or, by applying an electrical field strength of about zero, into an antiferroelectric order and cooling the liquid crystalline material below its glass transition temperature in the presence of the electrical field.

2. The process of claim 1 wherein the transition temperature is above 35° C.

3. The process of claim 2 wherein the glass transition temperature is above 45° C.

4. The process of claim 1 wherein the polymeric mesogenic liquid crystals are of the structural formula:

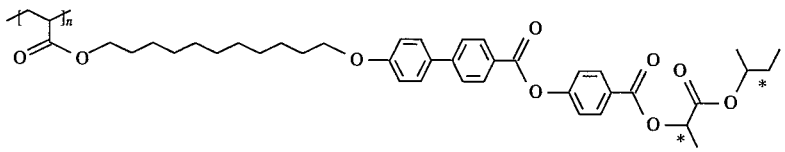

which have the phase behavior $G1\ 45\ S_{c\ A}^{*}\ 134\ S_A\ 160\ I$.

5. The process of claim 1 wherein the polymeric mesogenic liquid crystals are of the structural formula:

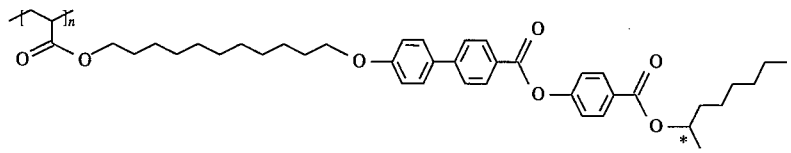

which have the phase behavior $G1\ 45\ S_{c\ A}^{*}\ 160\ S_A\ 185\ I$.

6. A process as claimed in claim 1, wherein an electrical field which has a strength greater than the critical field strength of from 3 to 40 V/μm, is applied during the cooing operation.

7. The process of claim 1 wherein the sign of the electric field applied during cooling is either positive or negative.

8. A process as claimed in claim 1, wherein no electrical field or such a small electrical field is applied during the cooling operation that the molecular transverse dipole moments of the mesogenic compounds are ordered in such a way that their dipole moments add up, in macroscopic terms, to zero or virtually zero, and thus a macroscopic dipole moment of zero or virtually zero results.

9. A process as claimed in claim 1, wherein, during the cooling operation, an electrical field of about 2 to 40 V/μm is applied, which is below the critical field strength and is thus of such a magnitude that no complete ferroelectric order is produced, so that the molecular dipole moments are not fully ordered, but a macroscopic dipole moment results which is proportional to the applied electrical field.

* * * * *

UNITED STATES PATENT AND TRADEMARK OFFICE
CERTIFICATE OF CORRECTION

PATENT NO.: 5,620,756

DATED: April 15, 1997

INVENTOR(S): BACH et al.

It is certified that error appears in the above-identified patent and that said Letters Patent is hereby corrected as shown below:

Column 6, claim 6, line 59, "cooing" should be --cooling--.

Signed and Sealed this

Twenty-second Day of July, 1997

Attest:

BRUCE LEHMAN

Attesting Officer

Commissioner of Patents and Trademarks